FIG. I

INVENTOR.
Arthur Whittaker Richardson
BY
Johnson and Kline
ATTORNEYS 3,119,438
LIQUID FUEL BURNERS
Arthur Whittaker Richardson, New Malden, England, assignor to Karma (New Malden) Limited
Filed May 17, 1960, Ser. No. 29,621
Claims priority, application Great Britain Jan. 1, 1960
1 Claim. (Cl. 158—88)

The present invention relates to an improved burner of the type commonly referred to as the short drum or perforated shell or sleeve burner.

If this type of burner is exposed to a draught, a down draught is apt to be formed in the burner which may, under certain conditions, create a fire hazard.

An object of the present invention is to provide a burner of the type referred to in which this hazard is substantially eliminated.

Broadly the invention comprises a device for incorporation into a burner of the type referred to and includes means for inducing automatically an increased upward pressure of air in the burner when a down draught is formed in the shells of the burner so as substantially to balance out the down draught in the burner.

According to one form of the invention an imperforate screen surrounds the lower end of the shell construction which screen extends beneath the burner element so as to form an imperforate screen below and around the lower end of the burner unit or assembly whereby the only air inlet to the burner is through the space between the outside casing of the burner and the screen surrounding it. The function of this screen is to produce a counter upward draught on the creation of a down draught in the shells so that the down draught is substantially eliminated or balanced out before it reaches the lower end of the flame.

It is preferred that the screen wall is concentrically arranged about the outer shell of the burner so as to provide with the floor a pot in which the lower end of the burner is situated. The height of the screen about the outer shell will depend upon the size of burner, the rate of burning and the other characteristics of the stove.

Conveniently the inside of the screen or pot may be contoured so as to provide a smooth flow of air first downwardly into the screen and then upwardly into the burner. Furthermore in order to prevent undesirable gathering of the air to one side or the other inside the screen or pot radial fins or partitions may be formed in the screen or pot so that the air is confined to a sector of the screen.

The invention will now be described with reference to the accompanying drawings in which.

Figure 1:
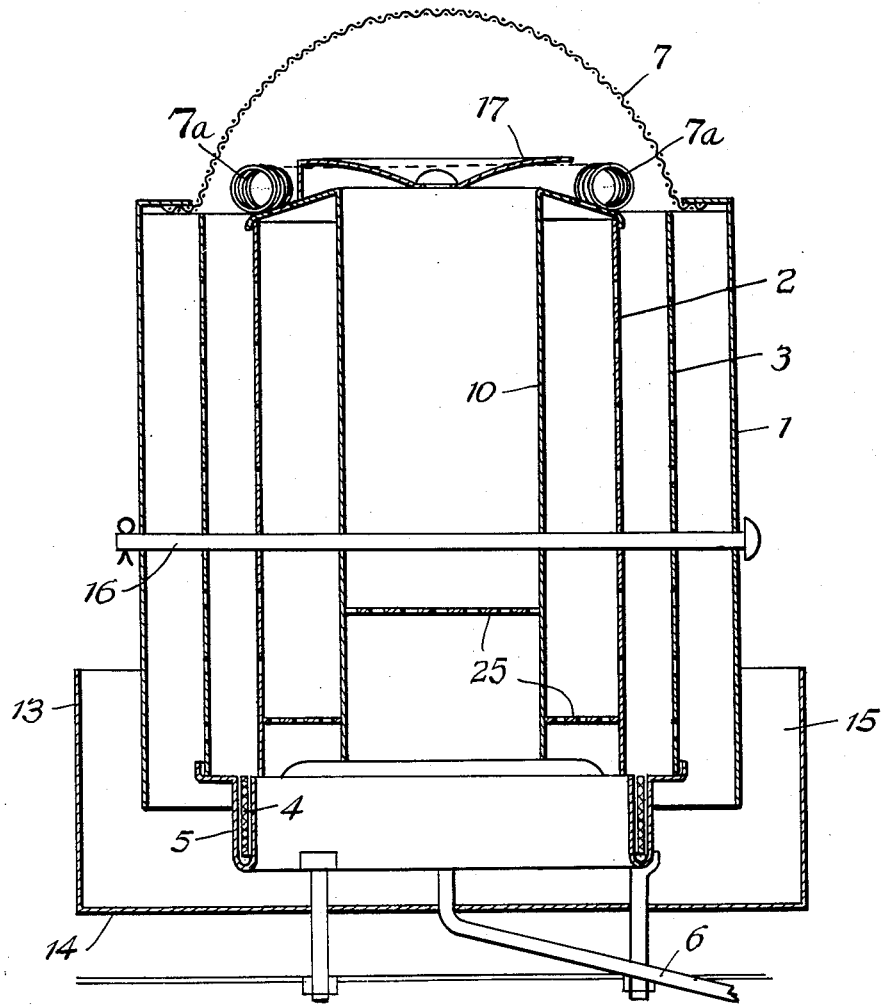
FIGURE 1 shows diagrammatically and in section a construction of burner in accordance with the present invention.

Referring to FIGURE 1, the burner itself is constructed in accordance with known practice and comprises an outer imperforate casing 1, a pair of inner perforated shells 2 and 3, and an inner imperforate air tube 10, the assembly being held together conveniently by a pair of rods at right angles, one of which 16 is shown. The shell construction stands on the top of a trough 5 which contains the wick 4, oil being fed to the trough in known manner by the feed pipe 6. The upper end of the burner is usually covered by a mantle 7 and a spreader plate 17 is located at the upper end of the air tube 10 to deflect air across the top of the burning gases ascending between the shells 2 and 3 and which impinge on a coiled wire ring 7a which is heated to incandescence thereby. This general construction and manner of operation is well known.

Heretofore the air for the burning oil has been allowed to enter the burner from underneath through any convenient air holes provided in the side or bottom of the casing in the stove and on the creation of a down draught in the space between the shells 2 and 3, for example by a draught being deflected from the reflector of the stove down into the burner, the flame is either suppressed momentarily and then flares up beyond the confines of the burner and reflector or the flame may even be deflected around the outside of the shell of the burner and may reach the fuel supply cup to ignite the paraffin or other fuel in the cup.

According to the present invention there is provided around the base an outer wall of the burner assembly a screen which, in accordance with the embodiment shown in FIGURE 1, comprises an imperforate cylindrical wall 13 provided with an imperforate base 14. The height of the cylindrical wall 13 should be such that any down draught is collected into the cylindrical vessel to create an increased upward pressure inside the burner which balances out any down draught created at the same time in the burner.

The cylindrical vessel in addition to serving to counteract and balance out any down draught in the burner also controls the entry of air to the burner since the only access for air to the burner is through the space 15 between the outer casing 1 of the burner and the cylindrical wall 13.

Figure 2:
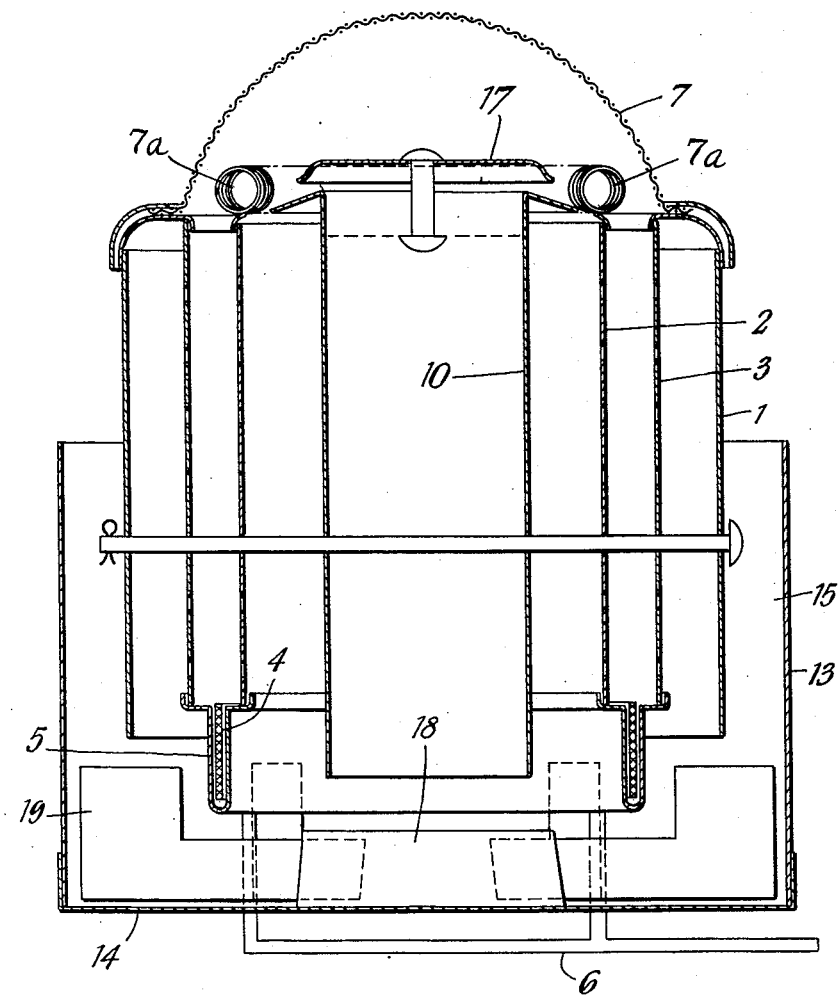
FIGURE 2 shows an alternative construction in accordance with the present invention.

FIGURE 2 shows a burner of the same general construction surrounded by a vessel of similar shape although in this case the cylindrical wall 13 extends higher up the burner. The base 14 is provided with a central upstand 18 to act as an upward deflector for the air entering into the vessel. Furthermore there is arranged around the floor 14 a number of equally spaced fins or partitions 19 which divide the circular floor and the lower part of the vessel into a number of equal sectors so that air entering the vessel or pot is prevented, when it reaches the base of the pot, from swirling around in the base and gathering to one side or the other. The fins or partitions 19 restrict the air entering that sector to that sector and direct and deflect it upwardly into the burner assembly. The floor 14 is conveniently arranged so as to allow the main feed pipe 6 to lie outside the vessel or pot and so to remain cool and to keep the temperature of the fuel in the pipe down to below boiling point.

If desired the inside of the pot or vessel may be contoured so as to give a smooth flow of air downwardly into the pot and so as to deflect the air in a curved path upwardly into the burner. Conveniently and to ensure that any air entering the burner assembly is flowing in a truly upward direction the outer shell 1 extends somewhat below the lower edge of the shells 2 and 3.

It will be realised that the invention is not limited to the construction shown in the drawings and, for example, the radial fins or partitions 19 may be of any desired number and may extend for any desired height either within the vessel or pot or up the annular passage between the vessel wall 13 and the outer shell 1 of the burner. If desired other baffles may be inserted either in this annular space or in the body of the pot or vessel to direct the air in any desired and beneficial direction. In addition perforated baffles 25 (see FIGURE 1) may be inserted in the pot or in the annular space or in or between one or more of the shells of the burner assembly in order to smooth out the air currents.

Whilst in most cases the burner assembly and the cylindrical surrounding wall 13 of the pot or vessel is concentric therewith, it will be realised that the cross section of the vessel or pot may be of any desired shape and may be provided with means for adjustment of its height with respect to the burner, the extent of the space between the cylindrical wall of the pot and the outer casing of the burner and its height being determined by the size of the burner, the rate of burning, and the amount of down draught likely to be encountered and the minimum draught conditions which the burner has to encounter.

What I claim is:

A liquid fuel burner comprising a burner unit formed by an inner imperforate air tube, a pair of concentric spaced perforated burner shells surrounding the said tube in spaced relation therewith, and an outer imperforate casing surrounding and spaced from the perforated shells; a fuel-receiving trough disposed beneath the burner unit in alignment with the said burner shells; and a cylindrical vessel surrounding and enclosing the lower end of the burner unit to provide a sole means for admitting combustion air to the burner shells, the said vessel comprising an upstanding imperforate cylindrical wall surrounding the said outer casing in spaced relation therewith and extending a substantial distance upwardly from the bottom of the said outer casing to provide therewith an annular air inlet channel, and an imperforate base connected with the lower end of the said wall and extending across and spaced below the lower end of the burner unit; and a central upstand and a plurality of partitions extending upwardly from said base to form a plurality of sectors for directing upwardly into the burner unit the air which enters downwardly through the channel between the outer casing of the burner unit and the cylindrical wall of the vessel.

References Cited in the file of this patent

UNITED STATES PATENTS

| | | |
|---|---|---|
| 812,513 | Moreno et al. | Feb. 13, 1906 |
| 848,586 | Blackford | Mar. 26, 1907 |
| 1,260,758 | Davis | Mar. 26, 1918 |
| 1,495,929 | Sherman | May 27, 1924 |
| 1,630,940 | Hoffman | May 31, 1927 |
| 2,515,640 | Duff | July 18, 1950 |

FOREIGN PATENTS

| | | |
|---|---|---|
| 150,684 | Austria | Sept. 25, 1937 |
| 216,439 | Australia | Aug. 4, 1958 |
| 487,505 | Great Britain | June 22, 1938 |
| 839,587 | Great Britain | Dec. 19, 1957 |
| 1,188,394 | France | Dec. 16, 1957 |